3,330,783
CELLULAR POLYURETHANE PLASTICS RENDERED FLAME RESISTANT BY RED PHOSPHORUS AND OPTIONALLY A HALOGENATED ORGANIC COMPOUND
Helmut Piechota and Hans Wirtz, Leverkusen, Germany, assignors to Farbenfabriken Bayer Aktiengesellschaft, Leverkusen, Germany, a German corporation
No Drawing. Filed Feb. 4, 1964, Ser. No. 342,540
Claims priority, application Germany, Feb. 7, 1963, F 38,948, Patent 1,173,641
5 Claims. (Cl. 260—2.5)

This invention relates to cellular polyurethane plastics and more particularly to cellular polyurethane plastics having improved flame resistance.

Cellular polyurethanes which have widely variant physical properties are now common commercial items. The reaction leading to their preparation is well-known and the technology of using various blowing agents, activators, emulsifiers and other additives is widely developed.

It has become increasingly important to impart flame resistant properties to polyurethane plastics. This is particularly true where cellular polyurethanes are used for example as insulation and to prevent the risk of fire in the daily use of other items. Numerous methods are known for imparting flame resistance. For example, one may use halogenated compounds or derivatives of phosphorous acids in the production of the cellular polyurethanes as the active hydrogen containing component and thus impart flame resistance. It is also possible to use compounds of antimony or boron. Moreover, non-reactive phosphorous or halogen containing compounds may be used as additives for this purpose. All of these substances are capable of imparting some flame resistant properties to polyurethane foam plastics. They have the disadvantage, however, that the use of increasing quantities leads to a serious impairment of the mechanical and physical properties of the cellular polyurethanes. Moreover, as the quantity of the flame resisting agents is increased, the problem of mixing the component containing the flame resisting agent with the balance of the components leading to the production of a cellular polyurethane plastic is increased.

It is therefore an object of this invention to provide flame resistant cellular polyurethane plastic having improved flame resistance which are substantially devoid of the foregoing disadvantages. Another object of the invention is to provide an improved process for the preparation of cellular polyurethane plastics containing flame resistant additives. Still another object of this invention is to provide a combination of flame resistant additives for cellular polyurethane plastics which together improve the flame resistance of the cellular polyurethane by more than just the additive effect of each. Still another object of this invention is to provide a cellular polyurethane plastic which has both a halogen containing component and a phosphorous containing component as a flame resisting agent.

The foregoing objects and others which will become apparent from the following description are accomplished in accordance with the invention, generally speaking, by providing a cellular polyurethane plastic containing red phosphorous. The invention further contemplates the combination of a halogen containing compound together with elemental red phosphorous for incorporation into a cellular polyurethane plastic as a flame resisting agent. These two components may be combined prior to foaming or they may be introduced simultaneously or sequentially into the reaction mixture. The combination of the elemental red phosphorous and the halogen containing compound asserts more than just their additive effect on the flame resistance of the cellular polyurethane plastic. Although the cellular polyurethane foams produced with the use of red phosphorous are still slightly combustible on the surface, this can be overcome completely by the addition of small quantities of the halogen containing compound so that cellular polyurethanes containing both are self-extinguishing. When exposed to an open flame, the cellular polyurethane plastics which have been prepared in accordance with the invention, form a very dense and firmly adhering crust which protects the underlying foam plastic from any further attack by the flames. This effect provides excellent protection even against an open flame and is not observed to any appreciable degree with the heretofore known phosphorous containing flame resisting agents.

The term, "red phosphorous" as used herein, refers to the amorphous phosphorous which is usually a brownish red powder of rhombohedral crystals, which is insoluble in water or carbon dioxide and could be formed by heating yellow phosphorous to 240° C. Red phosphorous is both nonpoisonous and nonluminous. It has an ignition point which varies between about 260 and about 460° C. depending on the quality of the phosphorous. Any suitable amount of red phosphorous may be used depending on the degree of flame protection required. It is preferred to use about 0.05 to about 20 per cent by weight of red phosphorous based on the total weight of the resulting foam. The red phosphorous can be added in any suitable form. For example, red phosphorous can be added in its original powder form directly to the reaction mixture. On the other hand, the phosphorous may be mixed with one of the components of the cellular polyurethane plastic to form a suspension or a paste before putting the components together with the balance of the components and this suspension or paste is then added in the required quantity to the cellular polyurethane producing reaction mixture. The advantage of the latter method is that the red phosphorous can very easily be measured accurately when in the form of a suspension or a paste. This is important in the manufacture of cellular polyurethanes on intermittently operating mixing machines which are equipped with piston pumps and in which the cellular polyurethane components are accurately measured in reproducible quantities for intermittent operation. It is preferred to add the red phosprorous in powdered form to a small measured amount of the polyol component and to agitate the mixture to keep the red phosphorous as a pasty suspension in the polyol which pasty suspension is then metered into the mixing equipment and taken account for when calculating the polyol component of the foam forming mixture.

Any suitable halogen containing compound may be used including both inorganic and organic compounds. Examples of suitable compounds include antimony trichloride, arsenic trichloride, antimony pentachloride, ammonium chloride, ammonium bromide, halogenated oils such as chlorinated or brominated castor oil, chlorinated or brominated tall oil or the like. It is moreover possible to use halogenated hydrocarbons such as tetrabromomethane, tetrachloroethane; polychlorodiphenyl such as 4,4'-dichlorodiphenyl, 2,2',4,4',-tetrachlorodiphenyl and the like. It is also possible to use esters of hexachloroendomethylene tetrahydrophthalic acid such as the diethyl ester of hexachloroendomethylene tetrahydrophthalic acid or ethers such as pentabromodiphenyl ether and the like. Moreover, the halogenated organic compounds may include those which contain additional phosphorous atoms in the molecule including trihaloalkyl phosphites such as, for example, tri-2-chloroethyl phosphite, tri-2,3-dibromopropyl phosphite, the addition product of epichlorohydrin and phosphoric acid wherein an average of two epichlorohydrin molecules are substituted on each hydroxyl group or the like. The quantity of halogen containing compound used depends somewhat on the required degree of flame resistance and is preferably such that the resulting cellular polyurethane plastic has a halogen content of from about 0.5 to about 30 percent by weight and preferably between about 1 and about 5 percent by weight. Mixtures of the halogen containing compounds may be used.

The cellular polyurethane plastics are prepared by the reaction of an organic polyisocyanate with an organic compound containing active hydrogen containing groups in the presence of a blowing agent. Suitable processes for the preparation of cellular polyurethane plastics are disclosed in U.S. Reissue Patent 24,514 together with suitable machinery to be used in conjunction therewith. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free —NCO groups which is then reacted in a second step with water to prepare a foam. Alternately, the components may be reacted in a single working step. Furthermore, instead of water, low boiling hydrocarbons such as pentane, hexane, heptane, pentene, heptene and the like; azo compounds such as azohexahydrobenzodinitrile and the like, halogenated hydrocarbons such as dichlorodifluoromethane, trichlorofluoromethane, dichlorodifluoroethane, vinylidene chloride, methylene chloride and the like may be used as blowing agents.

Any suitable organic polyisocyanate may be used including aliphatic and aromatic polyisocyanates, but it is preferred to use an aromatic di- or higher polyisocyanate preferably having from 2 to 4 free —NCO groups. Examples of suitable organic polyisocyanates including the heterocyclic organic polyisocyanates are 1,6-hexamethylene diisocyanate, 1,4-butylene diisocyanate, furfurylidene diisocyanate and the preferred aromatic polyisocyanates including 1-alkylbenzene-2,4- and 2,6-diisocyanates such as 2,4-toluylene diisocyanate, 2,6-toluylene diisocyanate and mixtures thereof, preferably a mixture of about 80 percent 2,4- and 20 percent 2,6-toluylene diisocyanate and mixtures thereof as well as 4,4'-diphenylmethane diisocyanate, 4,4'-diphenyl-3,3'-dimethylmethane diisocyanate, m-xylylene diisocyanate, p-xylylene diisocyanate, cyclohexylene diisocyanate, 4,4'-dimethyl-1,3'-xylylene diisocyanate, dicyclohexylmethane-4,4'-diisocyanate, 3-(alpha-isocyanatoethyl)-phenyl isocyanate, 2,6-diethylbenzine-1,4 - diisocyanate, diphenyl dimethylmethane-4,4'-diisocyanate, 1,5-naphthalene diisocyanate, 1-methyl-2,4-diisocyanato - 5-chlorobenzene, 2,4-diisocyanato-s-triazine, 1-methyl-2,4-diisocyanato cyclohexane, m-phenylene diisocyanate, p-phenylene diisocyanate, 1,4-naphthalene diisocyanate, 4,4',4"-triphenyl-methane triisocyanate, toluene-2,4,6-triisocyanates; the biuret polyisocyanates prepared by reacting, for example, hexamethylene diisocyanate with water under non-acid conditions and the like. In addition, it is often advantageous to use organic polyisocyanates and particularly mixtures of organic polyisocyanates which are in admixture with the by-products produced during the phosgenation of the corresponding amine. Suitable polyisocyanates of this type are, for example, the polyphenyl polymethylene polyisocyanates and other similar polyaryl polyalkylene polyisocyanates prepared by the phosgenation of a reaction product of an aromatic primary amine with an aldehyde or ketone such as formaldehyde or methyl ethyl ketone. Suitable compounds of this type are disclosed in U.S. Patents 2,683,730 and 2,760,953, in British Patent 874,430 and Canadian Patent 665,495. A particularly advantageous mixture of polyphenyl polymethylene polyisocyanates is prepared by phosgenating the reaction product of aniline with formaldehyde. This product is preferably prepared by first condensing aniline with formaldehyde under acid conditions and in such proportions that from about 40 to about 65 percent of the resulting mixture of polyphenyl methylene polyamines is a diphenylmethane diamine such as 4,4'-diphenylmethane diamine and the balance of the reaction mixture includes various corresponding triamines, tetra-amines and the like. This mixture of amines when phosgenated will produce an isocyanate which could be represented by the general formula:

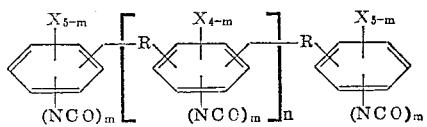

in which R is an organic radical and preferably an aliphatic radical obtained by removing the carbonyl oxygen from an aldehyde or ketone and is preferably —CH$_2$—, M is 1 or 2, X is halogen, lower alkyl or hydrogen and $n$ is 0, 1, 2 or 3. The aliphatic radical, R in the foregoing formula may be obtained by removing the carbonyl oxygen from any suitable aldehyde or ketone such as, formaldehyde, acetaldehyde, propionaldehyde, butyraldehyde, N-heptaldehyde, benzaldehyde, cyclohexane aldehyde, acetone, methyl ethyl ketone, methyl-n-propyl ketone, diethyl ketone, hexanon-2, hexanone-3, di-n-propyl ketone, di-n-heptyl ketone, benzophenone, dibenzyl ketone, cyclohexanone and the like. To illustrate, if one removes the carbonyl oxygen from formaldehyde, H$_2$C=O, the radical remaining is a methylene radical or from acetone, CH$_3$—CO—CH$_3$, the radical remaining is

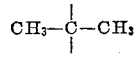

When X is halogen, it may be any suitable halogen but is preferably chlorine or bromine and further, it is preferred that the amount of chlorine or bromine fall between about one percent and fifteen percent by weight of the compound. When X is lower alkyl, it is most preferably methyl or ethyl but other lower alkyl radicals such as propyl, butyl and the like may be the radical, X. The polyaryl alkylene polyisocyanates of the invention are preferably mixtures of di- and higher polyisocyanates. Thus, $n$ in the formula preferably has a value of from about 0.1 to about 1.5. To illustrate, in a mixture of isocyanates of the above formula containing 90 percent diisocyanate and 10 percent triisocyanate, $n$ would have a value of 0.1. For a mixture containing 20 percent di-, 30 percent tri-, 30 percent tetra- and 20 percent penta-isocyanate, the average value of $n$ would be 1.5. A most preferred value for $n$ is between about 0.85 and about 1.1 with about 40 percent to about 60 percent of the mixture of polyisocyanates being a diisocyanate.

Isocyanates of the above formula are well-known and available commercially. They may be prepared as disclosed in U.S. Patent 2,683,730. A specific isocyanate suitable for use in accordance with the present invention may be obtained by reacting about 60 parts of aniline with about 25 parts of formaldehyde (aqueous, 37 percent CH$_2$O) and about 74 parts of HCl (aqueous, 30 percent HCl) at a temperature of about 90° C. to about 100° C. for about 1.5 to about 2 hours and then reacting this product with NaOH and separating out the crude amine. About 100 parts of phosgene are then reacted with the resulting amine until a product having an amine equivalent of about 135 and containing about 31 percent free —NCO is obtained. The free excess phosgene and substantially all of the solvents used, if any, are then removed.

The commercially available polyphenylmethane polyisocyanates are particularly adapted for use in the present invention. The best products have 40 percent to 60 percent 4,4'-diphenylmethane diisocyanate, an amine equivalent of about 125 to about 140, about 0.04 to about 0.4 percent by weight hydrolyzable chloride, about 0.1 to about 0.6 percent by weight total chloride and having a flash point of above about 400° F.

Still another category of organic polyisocyanates which could be used are the so-called unrefined toluylene diisocyanates. When toluylene diisocyanate is produced by phosgenation of relatively pure toluylene diamine, for example, a mixture of about 80 percent 2,4- and 20 percent 2,6-toluylene diamine, a mixture of products results which even without distillation, is liquid and desirable for the production of cellular polyurethane plastics. This product is also contemplated for use in the method of the present invention.

Any suitable organic compound containing at least two active hydrogen containing groups as determined by the Zerewitinoff method may be used. Generally speaking, any compound having an active hydrogen atom as defined above which will react with an —NCO group may be used. Hydroxyl groups react with —NCO groups to yield urethane groups whereas carboxylic acids yield amide groups and amines yield ureas. The alcoholic group is strongly preferred because it is readily available and yields a stronger urethane linkage than a phenolic type hydroxyl group. Moreover, to prepare polyurethane plastics, it is preferred to have an organic compound of the type specified above which contains a plurality of active hydrogen containing groups and preferably at least some alcoholic hydroxyl groups. It is to be understood that when the above terminology is used, active hydrogen containing compounds are contemplated which may contain any of the following types of active hydrogen containing groups, among others, —OH, —NH$_2$, —NH—, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course, compounds which contain two or more different groups within the above-identified classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and an —SH group and the like.

The molecular weight of the organic compound containing at least two active hydrogen containing groups may vary over a wide range. Preferably, however, at least one of the organic compounds containing at least two active hydrogen containing groups which is used in the production of the polyurethane plastic has a molecular weight of at least about 200 and preferably between about 500 and about 5000 with an hydroxyl number within the range of from about 25 to about 800 and acid number, where applicable, below about 5. A satisfactory upper limit for the molecular weight of the organic compound containing at least two active hydrogen containing groups is about 10,000 but this limitation may vary so long as satisfactory mixing of the organic compound containing at least two active hydrogen containing groups with the organic polyisocyanate can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha,beta-diethylsuccinic acid, isophthalic acid, terephthalic acid, hemimellitic acid, trimellitic acid, trimesic acid, mellophanic acid, prehnitic acid, pyromellitic acid, benzene-pentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-butylene glycol, 1,2-propylene glycol, 1,4-butylene glycol, 1,3-butylene glycol, 1,5-pentane diol, 1,4-pentane diol, 1,3-pentane diol, 1,6-hexane diol, 1,7-heptane diol, glycerine, trimethylolpropane, 1,3,6-hexane triol, triethanolamine, pentaerythritol, sorbitol and the like.

Any suitable polyhydric polyalkylene ether may be used such as, for example, the condensation product of an alkylene oxide beginning with any suitable initiator. The initiator may be a difunctional compound including water so that the resulting polyether is essentially a chain of repeating alkylene oxy groups as in polyethylene ether glycol, polypropylene ether glycol, polybutylene ether glycol, and the like; or the initiator may be any suitable active hydrogen containing compound which may be a monomer or even a compound having a relatively high molecular weight including other active hydrogen containing compounds as disclosed herein. It is preferred that the initiator have from 2 to 8 active sites to which the alkylene oxides may add, including for example, amines, alcohols and the like. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Any suitable initiator may be used including, for example, water, polyhydric alcohols, preferably having 2 to 8 hydroxyl groups, amines, preferably having 2 to 8 replaceable hydrogen atoms bonded to nitrogen atoms. Phosphorous acids may also be used, but the phosphorous compounds are somewhat peculiar in that a different mode of preparation may be required, as more particularly set forth below. The resulting polyhydric polyalkylene ethers with the various bases of nitrogen, phosphorous and the like may have either primary or secondary hydroxyl groups. It is preferred to use alkylene oxides which contain from 2 to 5 carbon atoms and, generally speaking, it is advantageous to condense from about 5 to about 30 mols of alkylene oxide per functional group of the initiator. There are many desirable processes for the preparation of polyhydric polyalkylene ethers including U.S. Patents 1,922,459, 3,009,939 and 3,061,625 or by the process disclosed by Wurtz in 1859 and in Encyclopedia of Chemical Technology, volume 7, pages 257 to 262, published by Interscience Publishers, Inc. (1951).

Specific examples of initiators are water, ethylene glycol, propylene glycol, glycerine, trimethylol propane, pentaerythritol, arbitol, sorbitol, maltose, sucrose, ammonia, diethanolamine, triethanolamine, dipropanolamine, tripropanolamine, diethanolpropanolamine, tributanolamine, 2,4-tolylene diamine, 4,4'-diphenylmethane diamine, p,p',p''-triphenylmethane triamine, ethylene diamine, propylene diamine, propylene triamine, N,N,N',N'-tetrakis-(2-hydroxypropyl) ethylene diamine, diethylene triamine. The phosphorous containing polyols are more fully described below.

Any suitable polyhydric polythioether may be used such as, for example, the condensation product of thiodiglycol or the reaction product of a polyhydric alcohol such as is disclosed above for the preparation of the hydroxyl polyesters with any other suitable thioetherglycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

Any suitable aliphatic polyol may be used such as, for example alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol and the like including 1,20-eicosane diol and the like; alkene diols such as, for example, 1-butene-1,4-diol, 1,3-butadiene-1,4-diol, 2-pentane-1,5-diol, 2-hexene-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexane triol, 1,3,7-heptane triol, 1,4,8-octane triol, 1,6,12-dodecane triol and the like; alkene triols such as 1-hexene-1,3,6-triol and the like; alkyne triols such as 2-hexyne-1,3,6-triol and the like; alkane tetrols such as, for example, 1,2,5,6-hexane tetrol and the like; alkene tetrols such as, for example, 3-heptene-1,2,6,7-tetrols and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane diethiol, 1,3,6-hexane trithiol and the like; alkene thiols such as, for example, 2-butene-1,4-dithiol, and the like; alkyne thiols such as, for example, 3-hexyne-1,6-dithiol and the like.

Any suitable polyamine may be used including for example aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridene, 2,4-diamino-5-aminomethyl pyrimidine, 2,5-diamino-1,3,4-thiadiazol and the like.

Any of the compounds of any of the classes set forth above may be substituted with halogen such as, for example, chloro, bromo, iodo and the like; nitro; alkoxy such as, for example, methoxy, ethoxy, propoxy, butoxy and the like; carboalkoxy such as, for example, carbomethoxy, carbethoxy and the like; dialkyl amino such as, for example, dimethyl amino, diethyl amino, dipropyl amino, methylethyl amino and the like; mercapto carbonyl, thiocarbonyl, phosphoryl, phosphato and the like.

In the production of the polyurethane foams, in addition to the organic polyisocyanate and the active hydrogen containing compound and the blowing agent, it is often advantageous to include other components which aid in making a product having the best physical properties. It is particularly desirable to use a catalyst and a stabilizer. Any suitable catalyst may be used, but as has been proposed heretofore, it is often desirable to have a mixture of a tin compound and a tertiary amine catalyst present.

Any suitable tin compound may be used including, for example, stannous chloride, or an organic tin compound. It is preferred to use the organic tin compounds such as the stannous salts of carboxylic acids including stannous oleate, stannous octoate, stannous stearate and the like. But one may also use tetravalent tin compounds including for example dibutyl tin dilaurate, dibutyl tin di-2-ethyl hexoate and the like. Any suitable tertiary amine catalyst may be used and a particularly strong tertiary amine catalyst is triethylene diamine. If weaker catalysts are desired, one may use, for example, N-methyl morpholine, N-ethyl morpholine, diethyl ethanolamine, N-coco morpholine, 1-methyl-4-dimethylamine ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine, permethylated diethylene triamine and the like.

It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula

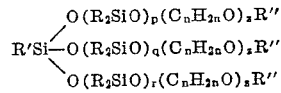

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. A preferred compound has the formula

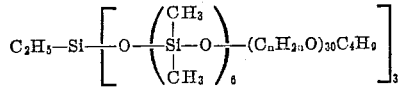

wherein $(C_nH_{2n}O)$ is a mixed polyoxyethylene and oxypropylene block copolymer containing about 17 oxyethylene units and about 13 oxypropylene units. Other suitable stabilizers are disclosed in Canadian Patents 668,478, 668,537 and 670,091. Other suitable compounds may therefore have the formula $$(R')(SiO_3)_x(R_2SiO)_y[(C_nH_{2n}O)_zH]_a[R''']_{3x-a}$$

where $x$ is an integer and represents the number of trifunctional silicone atoms bonded to a single monovalent or polyvalent hydrocarbon radical, R'; R is a monovalent hydrocarbon group as defined above; $a$ is an integer having a value of at least 1 and represents the number of polyoxyalkylene chains in the block copolymer; $y$ is an integer having a value of at least 3 and denotes the number of difunctional siloxane units, $n$ is an integer from 2 to 4 denoting the number of carbon atoms in the oxyalkylene group; and $z$ is an integer having a value of at least 5 and denotes the length of the oxyalkylene chain. It will be understood further that such compositions of matter are mixtures of such block copolymers wherein $y$ and $z$ are of different values and that method of determining the chain length of the polysiloxane chains and the polyoxyalkylene chains give values which represent average chain lengths. In the above formula, R represents monovalent hydrocarbon radicals, such as alkyl, aryl or aralkyl radicals, the polyoxyalkylene chain terminates with a hydrogen atom, R''' is an alkyl radical or a trihydrocarbonsilyl radical having the formula $R_3Si$— where R is a monovalent hydrocarbon radical and terminates a siloxane chain, and R' represents a monovalent or polyvalent hydrocarbon radical, being monovalent when $x$ is 1, divalent when $x$ is 2, trivalent when $x$ is 3, tetravalent when $x$ is 4.

One type of block copolymer is represented when $x$ in the above formula is one, and in this instance a branched chain formula may be postulated as follows:

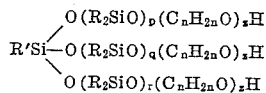

where $p+q+r=y$ of the above formula and has a minimum value of 3, the other subscripts being the same as in the foregoing formula. In this instance, all three of the oxyalkylene chains are joined to the end of polysiloxane chains of the type $-(R_2SiO)-$. Specifically, one could use

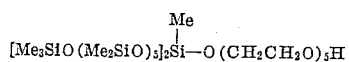

where Me is methyl.

Another class of stabilizer could be represented by the general formula

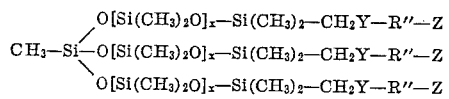

wherein $x$ is from 1 to 150, Y is $-NH$, $-NH'$, $=N-CO-R'$, $=N-CH_2CH_2-Z$, or O, R' is alkyl or aryl such as methyl, ethyl, propyl, phenyl or the like, R'' is an alkylene radical preferably having from 2 to 6 carbon atoms such as ethylene, propylene, isopropylene, butylene, hexylene or the like, and Z is $-NH_2$, $-OH$, $-NR'_2$, $-OR'$ or the like.

Specifically, one could use

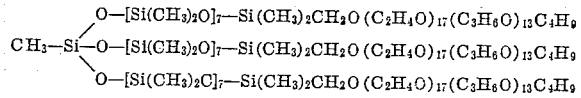

The polyurethane foams of the invention are particularly useful for the preparation of insulation, for example, in refrigerators or in the walls of a dwelling, for example. They may also be used to prepare floats, or for the preparation of decorative articles or cushions, pillows and the like.

Red phosphorous is easy and safe to handle and a relatively high phosphorous content can be obtained in the cellular polyurethane plastic with only minor dilution of the reaction mixture. In other words, by the addition of relatively small amounts of red phosphorous, one can obtain a high degree of flame resistance. The products of the present invention do not need to contain much of the red phosphorous and consequently, the mechanical and physical properties of the resulting foam plastics are not impaired, even with addition of enough red phosphorous and halogen containing compound to impart a high degree of flame resistance to the resulting product. This was not true with the heretofore known phosphorous containing additives or halogen containing additives. With these prior additives one only obtained flame resistance at the expense of physical and mechanical properties or vice versa. Furthermore, by using mixtures of red phosphorous and a halogen containing compound, it is possible to produce a higher degree of flame resistance than with corresponding amounts of either when used alone. The combination results in very short burn times not experienced in foams having satisfactory physical and mechanical properties. Foams with only minor amounts of the combined additives are self-extinguishing. Some with slightly greater amounts only char a little, but are not consumed, even on prolonged exposure to open flame. Flame resistance in cellular polyurethanes becomes increasingly important as they move from industrial applications to the domestic market. Home insulation must be flame resistant, otherwise the expense of brick or aluminum siding and other flame resistant materials is wasted. The present invention provides for the use of an inexpensive material, red phosphorous, as the major component in producing a flame resistant cellular plastic. This invention should provide the final piece in the puzzle of home insulation—fire resistant, low cost, permanent, soundproof insulation. Another very important field where this invention can be put to immediate and good use is in the mining industry where flame proof, temporary, gas impermeable walls are required to seal off unused passages.

The cellular polyurethanes of the invention are useful for example to prepare cushions such as pillows and particularly for the production of insulation as in the wall of a dwelling, for example, or for acoustical tile or in the production of furniture or other household articles where a high degree of flame resistance is required.

The invention is further illustrated by the following examples in which parts are by weight unless otherwise specified.

*Examples 1–10 and Comparative Tests I–X*

The foam plastics are produced by adding together the components and stirring them rapidly and intensely. The required foam plastic is then formed after the mixture has been poured into an open mold.

The starting materials required for the production of the various types of foam plastic are summarized in the following table.

The combinations indicated in Roman numerals in the table have been prepared without the use of red phosphorous and are used only for the purpose of comparison.

The table also contains the result of the combustion test according to ASTM-D 1692. It will be seen from this that the addition according to the invention of red phosphorous either reduces the time of combustion before self-extinction or at least reduces the speed of combustion.

The results given for the combustion test do not indicate one feature which is not without practical importance and that is that the foam plastics which contain red phosphorous form a firmly adhering, thick crust in a flame, thereby protecting the underlying foam plastic from further attack. Thus, the foam plastics indicated under I to VII are burnt almost completely in the ASTM test whereas the phosphorous-containing foam plastics mentioned in Examples 1–3 and 5 are attacked only on the surface and 80 to 85 percent of the volume of the test sample still consists of unchanged foam plastic at the end of the combustion test.

In the Table:

A indicates a polyester of 1 mol of adipic acid, 2.6 mols of phthalic acid, 1.3 mols of oleic acid and 6.9 mols of trimethylolpropane (OH number 370; acid number 1).

B indicates an addition product of trimethylolpropane and propylene oxide (OH number 380).

C indicates an addition product of 1 mol of trimethylolpropane and 3 mols of propylene oxide (OH number 550).

D indicates N,N,N',N',-tetrakis-(beta-hydroxypropyl)-ethylene diamine.

E indicates tall oil, acid number 130.

F indicates chlorinated tall oil, acid number 130.

G indicates brominated castor oil (OH number 60, acid number 46).

H indicates trichloro-monofluoro-methane.

I indicates sulphonated castor oil (Na-salt); water content 50 percent.

J indicates tri-(2-chloroethyl)-phosphate.

K indicates tri-(2,3-dibromopropyl)-phosphate.

L indicates ammonium chloride.

M indicates ammonium bromide.

N indicates permethylated diethylene triamine.
O indicates N-methyl-N'-(N - dimethylaminoethyl)-piperazine.
P indicates dibutyl tin dilaurate.
Q indicates polysiloxane polyalkylene glycol ester having the formula

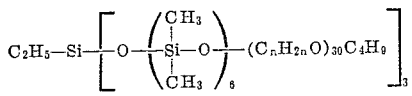

wherein $(C_nH_{2n}O)$ is a mixed polyosyethylene and oxypropylene block copolymer containing about 17 oxyethylene units and about 13 oxypropylene units.

R indicates a mixture of polyaryl alkylene polyisocyanates obtained by phosgenating the reaction product of aniline with formaldehyde, said mixture of organic polyisocyanates having the formula

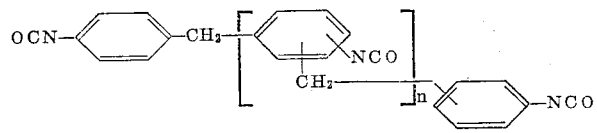

wherein $n$ has an average value of 0.88 and contains about 50 percent diisocyanate and about 21 percent triisocyanate, the balance being tetra- and penta-isocyanates sufficient to give $n$ a value of about 0.88.

S indicates a paste of red phosphorous and B, phosphorous content 50 percent.

diamine, 0.1 part by weight of dibutyl tin dilaurate, 1 part of the silicone oil Q of Examples 1 to 10, 3 parts by weight of water and 80 parts by weight of toluylene diisocyanate (80:20). The foaming mixture is poured into an open mold where it expands to an elastic foam which is less inflammable when compared with the same foam without red phosphorus.

It is to be understood that the foregoing examples are for the purpose of illustration and that any other suitable active hydrogen containing compound, organic polyisocyanate, halogen containing compound or the like could be used therein provided that the teachings of this disclosure are followed.

Although the invention has been described in considerable detail in the foregoing, it is to be understood that such detail is solely for the purpose of illustration and that variations can be made therein by those skilled in the art without departing from the spirit and scope of the invention except as set forth in the claims.

What is claimed is:

1. A cellular polyurethane plastic containing a flame-retarding amount of red phosphorus.
2. The cellular polyurethane plastic of claim 1 wherein said red phosphorus is present in an amount of from about 0.05 to about 20% by weight.
3. The cellular polyurethane plastic of claim 1 wherein is contained, in addition to the red phosphorus, a halogen containing compound selected from the group consisting of arsenic halides, ammonium halides and halogenated organic compounds.

TABLE 1

| | I | 1 | II | 2 | III | 3 | IV | 4 | V | 5 | VI | 6 | VII | 7 | VIII | 8 | IX | 9 | X | 10 |
|---|---|---|---|---|---|---|---|---|---|---|---|---|---|---|---|---|---|---|---|---|
| Starting Material: | | | | | | | | | | | | | | | | | | | | |
| A | 30 | 29 | 40 | 38 | 100 | 97 | 90 | 88 | 90 | 88 | 100 | 98 | 100 | 98 | 90 | 88 | 95 | 95 | 98 | 98 |
| B | 50 | 48 | 20 | 20 | | | | | | | | | | | | | | | | |
| C | | | 40 | 39 | | | | | | | | | | | | | | | | |
| D | 20 | 18 | | | | | | | | | | | | | | | | | | |
| E | | | | | | | 10 | 10 | | | | | | | | | | | | |
| F | | | | | | | | | 10 | 10 | | | | | 10 | 10 | | | | |
| G | | | | | | | | | | | | | | | | | | | | |
| H | 30 | 30 | 30 | 30 | | | | | | | | | | | | | | | | |
| I | | | | | 6 | 6 | 5.8 | 5.8 | 5.8 | 5.8 | 6 | 6 | 6 | 6 | 6 | 6 | 6 | 6 | 6 | 6 |
| J | | | | | | | | | | | | | | | | | 7.5 | 7.5 | 7.5 | 10 |
| K | | | | | | | | | | | 3.8 | 3.8 | | | | | | | | |
| L | | | | | | | | | | | | | 3 | 3 | | | | | | |
| M | | | | | | | | | | | | | | | | | | | | |
| N | 1 | 1 | 2 | 2 | | | | | | | | | | | | | | | | |
| O | 1 | 1 | 2 | 2 | 2 | 2 | 2 | 2 | 2 | 2 | 2 | 2 | 2 | 2 | 2 | 2 | 2 | 2 | 2 | 2 |
| P | 0.1 | 0.1 | | | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Q | 1 | 1 | 1 | 1 | 2 | 2 | 2 | 2 | 2 | 2 | 2 | 2 | 2 | 2 | 2 | 2 | 2 | 2 | 2 | 2 |
| R | 70 | 72 | 69 | 65 | 140 | 137 | 138 | 135 | 138 | 135 | 138 | 138 | 139 | 139 | 140 | 140 | 135 | 136 | 138 | 139 |
| S | | 7 | | 6 | | 7 | | 7 | | 7 | | 7 | | 7 | | 7 | | 6 | | 4.5 |
| Flame test according to ASTM-D 1692 | X | X | X | X | X | X | X | X | X | X | X | X | X | X | X | X | X | X | X | X |
| Combustible with combustion velocity (mm/sec.) | 5.0 | 3.5 | 8.1 | 6.3 | 2.9 | 1.9 | 2.9 | | 1.9 | 1.4 | 1.4 | | 1.2 | | 3.0 | | | | | |
| Self extinguishing after combustion mm | | | | | | | | 69 | | | | 48 | | 45 | | 26 | 43 | 19 | 64 | 21 |

Example 11

The following ingredients are thoroughly and simultaneously mixed together. 100 parts by weight of a polyester prepared from 15.6 mols of adipic acid, 16.3 mols of diethylene glycol, 1 mol of trimethylolpropane (OH number 56, acid number 1), 12 parts by weight of a paste consisting of 50 percent of red phosphorus and 50 percent of trichloroethyl phosphate, 1.5 parts by weight of dimethylbenzyl amine, 1 part by weight of the sodium salt of a sulfonated castor oil (54 percent water), 3.5 parts by weight of water, 60 parts by weight of toluylene diisocyanate (65:35). The foaming mixture is poured into an open mold where it expands to an elastic foam which is less inflammable when compared with the same foam without red phosphorus.

Example 12

The following ingredients are thoroughly and simultaneously mixed together. 100 parts by weight of a polyether prepared from trimethylolpropane and propylene oxide (OH number 40), 14 parts by weight of the red phosphorus paste of Example 11, 0.25 part by weight of triethylene 4. The cellular polyurethane plastic of claim 3 wherein said halogenated organic compound is a trihaloalkyl phosphite.
5. A cellular polyurethane plastic containing from about 0.05 to about 20 percent by weight of red phosphorous and a halogenated organic compound sufficient to give a halogen content in the final product of from about 0.5 to about 30 percent by weight.

References Cited

UNITED STATES PATENTS 3,041,296    6/1962    Lindlow et al. _____ 260—2.5

OTHER REFERENCES

Merck Index, 7th Edition, page 810, call No. RS-356-M524-1960.

DONALD E. CZAJA, Primary Examiner.

LEON J. BERCOVITZ, Examiner.

J. J. KLOCKO, G. W. RAUCHFUSS,
Assistant Examiners.